United States Patent
Stolzer et al.

(10) Patent No.: US 11,505,418 B2
(45) Date of Patent: Nov. 22, 2022

(54) TURNING STATION FOR METAL SHEETS OR METAL SHEET STACKS, AND METHOD FOR USING THE TURNING STATION

(71) Applicant: KEURO Besitz GmbH & Co. KG EDV-Dienstleistungs KG, Achern (DE)

(72) Inventors: Armin Stolzer, Baden-Baden (DE); Sonke Florian Krebber, Baden-Baden (DE)

(73) Assignee: KEURO Besitz GmbH & Co. KG EDV-Dienstleistungs KG, Achern (DE)

(*) Notice: Subject to any disclaimer, the term of this patent is extended or adjusted under 35 U.S.C. 154(b) by 53 days.

(21) Appl. No.: 17/101,047

(22) Filed: Nov. 23, 2020

(65) Prior Publication Data

US 2021/0155433 A1 May 27, 2021

(30) Foreign Application Priority Data

Nov. 22, 2019 (DE) .......................... 102019008122.6

(51) Int. Cl.
*B65H 15/00* (2006.01)
*B65H 15/02* (2006.01)

(52) U.S. Cl.
CPC ........... *B65H 15/016* (2020.08); *B65H 15/02* (2013.01); *B65H 2301/33214* (2013.01); *B65H 2301/42266* (2013.01); *B65H 2701/173* (2013.01)

(58) Field of Classification Search
CPC ........... B65H 2301/33214; B65H 2301/42266; B65H 15/016; B65H 15/02; B65H 2701/173; B65G 2201/022; B21B 39/32
See application file for complete search history.

(56) References Cited

U.S. PATENT DOCUMENTS

| 3,770,141 A | 11/1973 | Tolf et al. |
| 4,178,119 A | 12/1979 | Busch |

(Continued)

FOREIGN PATENT DOCUMENTS

| AT | 310639 | 10/1973 |
| DE | 2628504 | 1/1978 |

(Continued)

OTHER PUBLICATIONS

STOPA COmpact Turner, https://www.youtube.com/watch?v=w3nd4lggllA (accessed on Oct. 28, 2019).

*Primary Examiner* — Lynn E Schwenning
(74) *Attorney, Agent, or Firm* — Volpe Koenig

(57) ABSTRACT

A turning station for metal sheets or metal sheet stacks, having a first support which forms a first support plane for a first side of the metal sheets, and having a second support which forms a second support plane for a second side of the metal sheets. The supports are rotatable about a horizontal rotation axis and provided with a plurality of detents which project beyond longitudinal edges of the metal sheets. The supports are part of a rotary installation with a frame having two end-side rotary bearings on a common rotation axis and a basket which is mounted in the two rotary bearings for motorized rotation about the rotation axis, the basket having end-side linear guides for the two supports. The supports by way of support planes which extend in parallel and are oriented toward one another are held in the basket such that the rotation axis is situated between the two support planes and the two supports in the end-side linear guides are in each case movable in a motorized manner in a movement direction toward and away from the rotation axis. Methods for unpackaging, storing, and turning metal sheet stacks are also provided.

17 Claims, 5 Drawing Sheets

(56) References Cited

U.S. PATENT DOCUMENTS 4,354,788 A   10/1982   Giusti
9,828,189 B2  11/2017   Tillman et al.

FOREIGN PATENT DOCUMENTS

| DE | 3006229 | | 8/1980 | |
|----|---------|---|--------|---|
| DE | 20215478 | | 2/2004 | |
| DE | 102012216484 | | 1/2014 | |
| DE | 102013101148 | | 8/2014 | |
| FR | 2588251 | * | 4/1987 | ............ B65G 61/00 |
| GB | 1585830 | | 3/1981 | |
| JP | H05155427 | | 6/1993 | |
| JP | 2001171828 | | 6/2001 | |
| KR | 100776287 | | 11/2007 | |

* cited by examiner

TURNING STATION FOR METAL SHEETS OR METAL SHEET STACKS, AND METHOD FOR USING THE TURNING STATION

INCORPORATION BY REFERENCE

The following documents are incorporated herein by reference as if fully set forth: German Patent Application No. DE 10 2019 008 122.6, filed Nov. 22, 2019.

TECHNICAL FIELD

The invention relates to a turning station for metal sheets or metal sheet stacks, and to a method for unpackaging metal sheet stacks, to a method for storing metal sheet stacks, and to a method for turning metal sheets or metal sheet stacks, using in each case such a turning station.

BACKGROUND

A turning station of the present type accordingly comprises a first support which forms the first support plane for a first side of the metal sheets, as well as a second support which forms a second support plane for a second side of the metal sheets. The two supports are in each case rotatable about a horizontal axis and provided with a plurality of detents which for longitudinal edges of the metal sheets project beyond the support planes of the supports. The mentioned two sides of the metal sheets or the metal sheet stacks which are to be handled by the turning station correspond to an upper side and a lower side of a metal sheet, said upper side and said lower side moreover having four longitudinal edges which are typically distributed so as to be two broadside edges and two end-side edges when the metal sheets are cut to a rectangular shape.

Turning stations of the present type which are used in particular when storing metal sheets or metal sheet packs in a sheet metal storing system, wherein metal sheets having typical dimensions from 2000 mm×1000 mm to 4000 mm×2000 mm and typical weights from 2000 to 4000 kg have to be handled. To this end, metal sheet stacks are typically supplied in a protective packaging so that the metal sheet stacks first have to be released from the protective packaging. Such a protective packaging is usually composed of a lower wooden pallet on which the metal sheet stack bears, and an upper wooden pallet, wherein there are usually also intermediate layers between the wooden pallets and the metal sheet stack as well as encircling H-protection elements around the longitudinal edges of the metal sheet for protecting the surfaces and the edges of the metal sheets. The entire pack is finally strapped with a plurality of steel bands.

A turning station of the present type which is used when storing a metal sheet stack in a sheet metal warehouse, for example a sheet metal warehouse of a steel trader, so as to release a supplied metal sheet stack from the protective packaging of the latter and for subsequently storing the metal sheet stack in an automated manner in the sheet metal warehouse has become known from a video clip at the internet address (URL) https://www.youtube.com/watch?v=w3nd4IggIlA (accessed on Oct. 28, 2019). In this video clip, a metal sheet stack including the protective packaging thereof is placed on a first support which is formed from a plurality of webs, the forks of a forklift truck being able to be moved between said webs. After the metal sheet stack has been placed by a forklift truck, the protective packaging is opened and the wooden pallet on the upper side in particular is removed until the upper side (second side) of the uppermost metal sheet is finally exposed. The first support is thereafter pivoted by almost 90 angular degrees about a horizontal axis, whereupon a second support having a second support plane which extends so as to be parallel to the first support plane is moved to the exposed second side of the metal sheet stack and is brought to bear on the latter. The two supports are now conjointly pivoted about the horizontal axis such that the first support has been rotated by more than 90° in relation to the initial position. On account thereof, the metal sheet stack now bears on the second support so that the first support can be removed. The second support is thereafter pivoted further about the horizontal axis until the second support plane extends horizontally. On account thereof, the metal sheet stack has consequently been rotated, that is to say turned, by 180 angular degrees. The metal sheet stack in this situation is now released from the remaining protective packaging. The turning station is subsequently used for placing the metal sheet stack onto a pallet, wherein the metal sheet stack is turned once more. The storage in the sheet metal warehouse then takes place on this pallet.

The transfer of the metal sheet stack from the first support to the second support according to this prior art requires complex controlling of the movements of the first support and the second support, because the height of the metal sheet stack may vary. The two supports therefore have to be moved in a rotary as well as a translatory manner in order to be able to transfer the metal sheet stack from the first support to the second support. Moreover, the two supports by virtue of the comparatively high weights of the metal sheet stacks to be handled not only have to be solidly configured but also have to be provided with correspondingly strong drives and force transmission installations.

The accessibility of the metal sheet stack for removing a protective packaging is typically very restricted in other known solutions for storing metal sheet stacks.

Finally, a turning station of the present type is not only to be suitable for unpackaging and storing metal sheet stacks but also for turning individual metal sheets or else metal sheet stacks for the purpose of inspection in the case of quality assurance measures for the purpose of commissioning, for example of checker plates or bulb plates.

SUMMARY

The invention is therefore based on the object of providing a turning station for metal sheets or metal sheet stacks of the type mentioned at the outset which operates in particular using simpler kinematics. Furthermore, methods are provided for using this turning station for unpackaging, storing, and/or turning metal sheets or metal sheet stacks.

This object is achieved by a turning station having one or more features described herein as well as by a method for unpackaging metal sheet stacks, by a method for storing metal sheet stacks, as well as by a method for turning metal sheets or metal sheet stacks having one or more of the features described herein. Advantageous design embodiments of the turning station according to the invention are described below and in the claims; preferred refinements of the methods according to the invention are also set forth below and in the claims.

A turning station according to the invention for metal sheets or metal sheet stacks, having a first support which forms a first support plane for a first side of the metal sheets, and having a second support which forms a second support plane for a second side of the metal sheets, and in which the two supports are in each case rotatable about a horizontal axis and provided with a plurality of detents which for longitudinal edges of the metal sheets project beyond the support plane of the supports is accordingly distinguished in that the two supports are part of a rotary installation which moreover comprises a frame having two end-side rotary bearings which lie in a common rotation axis and a basket which is mounted in the two rotary bearings and in a motorized manner is rotatable about the rotation axis, said basket having end-side linear guides for the two supports. The two supports herein by way of support planes which run in parallel and are oriented toward one another are held in the basket in such a manner that the rotation axis is situated between the two support planes and the two supports in the end-side linear guides are in each case movable in a motorized manner in a movement direction toward the rotation axis and away from the latter.

The rotating installation of the turning station according to the invention is thus the core unit for turning metal sheets or metal sheet stacks. In order for metal sheet stacks to be unpacked, it is first insured according to the invention that the rotary installation is situated in a neutral position in which the two supports are mutually spaced apart and the support planes run horizontally. In this neutral position the metal sheet stack is introduced into the rotary installation, for example by a forklift truck, and is deposited onto the support which is momentarily placed below (first support). When the supports are in each case formed by a plurality of webs which extends transversely to the rotation axis, as is preferred according to the invention, the depositing of the metal sheet stack using a fork lift truck is simplified since the fork of the latter can be guided through between the individual webs of the support.

Once the metal sheet stack has been introduced into the rotary installation and with open packaging bears on the first support, wherein the packaging has been opened before the introduction into the rotary installation or preferably only upon the introduction into the rotary installation, the two supports are converged until the metal sheet stack is clamped between the two supports. Since the two supports, as is preferred in the context of the present invention, are movable in a manner mirror-symmetrical to the plane of the rotation axis and are preferably also moved thus, the rotation axis in this stage of the method runs so in an approximately centric manner through the metal sheet stack. A rotation of the rotatable basket of the rotary installation by 180 angular degrees, as is performed according to the invention, can therefore be carried out using substantially lower forces in comparison to the prior art, because the rotation axis in the rotary installation according to the invention is situated so as to be very much closer to the center of gravity of the metal sheet stack than in the prior art. Moreover, the problematic transfer of the metal sheet stack from the first support to the second support is dispensed with, because the metal sheet stack is clamped between the two supports during the rotation, that is to say during the turning.

After the rotation the rotatable basket of the rotary installation by 180 angular degrees the two supports are diverged again such that the metal sheet stack now bears on the second support which is now disposed below, and can be released from the remainder of the packaging, this preferably taking place before retrieving the metal sheet stack from the rotary installation, but in the context of the present invention may also take place after the retrieval. Alternatively, the remainder of the packaging of the metal sheet stack is removed, the two supports are thereafter converged again, and the rotatable basket of the rotary installation is reversed by 180 angular degrees again prior to the metal sheet stack being retrieved from the rotary installation. Said metal stack can then be stored in a warehouse in the same orientation in which said sheet metal stack has originally been supplied.

The two supports of the turning station according to the invention are preferably constructed so as to be substantially identical such that the rotary installation upon the retrieval of a metal sheet or of a metal sheet stack is already situated back in the neutral position without having to carry out a rotation of 180 angular degrees back to said neutral position. This not only saves time but to this extent also prevents any operating error.

The turning station according to the invention thus has kinematics which are easier to manage than has been possible in the prior art. The basket which is rotatable about the rotation axis at the end sides sits in the rotary bearings of the frame of the rotary installation and is preferably configured so as to be symmetrical to the rotation axis; rotating is performed in a clearly rotary manner and by way of largely balanced weight forces about a horizontal rotation axis. This is easy to achieve in a motorized manner. The rotatable basket at the end sides is in each case provided with one linear guide in which the two supports sit, specifically so as to be oriented toward one another, wherein the two support planes run in parallel and (at least in the neutral position) lie below and above the horizontal rotation axis. The support planes preferably also run parallel to the rotation axis. The two supports by the linear guides attached at the end sides in the rotatable basket can be moved in a motorized and linear manner toward the rotation axis and away from the latter, wherein the two support planes run in each case so as to be mutually parallel also during this movement. Such linear movements are also easy to implement in kinematic terms, and to be realized while preferably using electromotive drives. The linear guides are preferably provided with racks or operatively connected to racks in order to be able to move the supports along the linear guides.

A mobility of the two supports so as to be mirror-symmetrical to the plane of the rotation axis is particularly simple in kinematic terms; in the context of the present invention the supports can however also be configured so as to be separately movable.

According to one preferred refinement of the turning station according to the invention, at least part of the detents for longitudinal edges of the metal sheets that are disposed on the supports and project beyond the support planes are provided with track rollers for the longitudinal edges. This enables a metal sheet stack in the rotary installation to be aligned in that the rotary installation upon introducing and depositing the metal sheet stack as well as after converging the two supports and clamping the metal sheet stack is rotated by only 90 angular degrees, and the two supports are then slightly diverged such that all metal sheets can be aligned on the detents, on the one hand, and also be pushed together at the end sides, on the other hand, so as not only to align the metal sheets of the metal sheet stack among one another but optionally also to be pushed to a defined initial position for further processing. To this end, the turning station according to the invention is preferably provided with at least one pushing unit for placing onto the longitudinal edges of the metal sheet and for pushing metal sheets within a displacement plane which is parallel to the support planes. At least one pushing unit is preferably responsible for pushing the metal sheets by way of the longitudinal edges on the broadsides thereof against the detents and for thus aligning the metal sheets on the detents, while two pushing units, which engage in each case on an end-side longitudinal edge of the metal sheets, with the aid of the track rollers are responsible for pushing together the metal sheets on the detents and to thus align said metal sheets also at the end sides.

It is preferable in particular in this context for the introducing of the metal sheet stack into the rotary installation and the depositing of said metal sheet stack on the support which is momentarily disposed below take place in such a manner that the metal sheet stack on at least one longitudinal edge of the metal sheets bears on the detents which project beyond the support plane of the support. When the metal sheet stack is placed into the rotary installation by way of a forklift truck, this can take place in a very simple manner in that the forks of the forklift truck are not lowered completely below the support but while retracting the forks from the rotary installation pull the metal sheet stack against the detents; these then hold back the metal sheet stacks. The forks of the forklift truck when placing can also be lowered so far until the metal sheet stack does indeed not yet bear on the support but bears on the detents when the forks are retracted. The forks of the forklift truck can then be lowered below the support and be fully moved out of the rotary installation. The metal sheet stack thus already bears on the detents when said metal sheet stack in the neutral position of the rotary installation bears on the first support. The rotary installation is then expediently rotated in each case such that the longitudinal edge of the metal sheets that bears on the detents is oriented downward.

A further preferred design embodiment of the turning station according to the invention lies in that said turning station in addition to the rotary installation has a stationary transfer installation having a plurality of horizontally oriented bars, in particular telescopic bars, which on both sides are conjointly deployable in a horizontal manner for depositing the metal sheets or the metal sheet stack. The bars, or telescopic bars, respectively, are deployable on a first broadside of the transfer installation so as to engage below a support in the rotary installation, and the bars or telescopic bars, respectively, on a second broadside of the transfer installation are deployable so as to transfer metal sheets or the metal sheet stack to a transport installation.

It is furthermore preferable for the turning station in addition to the rotary installation and the transfer installation to also have a transport installation, wherein the transfer installation is disposed between the rotary installation and the transport installation, and wherein the transport installation comprises at least one pallet for depositing and storing metal sheets or metal sheet stacks.

It is particularly preferable herein for the frame of the installation to be provided with running wheels, in particular with running wheels for rails so as to be able to displace or reposition the rotary installation. It is particularly preferable herein for the rotary installation and the running wheels thereof, as well as the stationary transfer installation, to be mutually adapted in such a manner that the rotary installation by the running wheel is at least partially movable across the stationary transfer installation.

By way of these preferred refinements of the turning station according to the invention the latter is subdivided into two or three regions. The rotary installation for turning the metal sheets or the metal sheet stack as well as for precisely aligning the latter to a defined neutral position on the support which in each case lies below is situated in the first region. The second region is formed by the stationary transfer installation which is disposed at a defined relative position in relation to the rotary installation and retrieves the metal sheet or metal sheet stacks from the rotary installation and, since the movement begins in a defined neutral position of the metal sheet or of the metal sheet stack, by way of positively defined coordinates can transfer said metal sheet or metal sheet stack to a transport installation beside the transfer installation. This transport installation, which may already be part of a warehouse, however is preferably part of the turning station according to the invention, forms the third region from where the metal sheet or the metal sheet stack can be stored in an automated manner in a metal sheet warehouse, for example.

This subdivision into three regions facilitates operational safety to be maintained without compromising the operating speed, because only the first region, thus the rotary installation, has to be accessible to an operator so as to place therein metal sheets or metal sheet stacks by a forklift truck, for example, or so as to remove items of safety packaging. While an operator is at the rotary installation and carries out operative steps there, the other regions, thus the transfer installation as well as optionally the transport installation can continue to run unaffected.

The separate transfer installation having deployable bars, in particular telescopic bars, for retrieving metal sheets or metal sheet stacks from the rotary installation moreover has the great advantage that the rotary installation can be kept free of such transfer elements which would otherwise exert great angular forces on the rotary drives of the rotary installation.

By way of the track wheels on the rotary installation that are preferably present, there is moreover the advantage that the rotary installation when required can be moved away from the transfer installation, but in particular can be at least partially moved across the latter. In the first case, the access to the rotary installation is simplified, while in the latter case the rotary installation and the transfer installation can be pushed together so to speak, so as to achieve space when required; that is to say that the floor space required for the turning station according to the invention does not have to be occupied in general but only when the turning station is being used.

The transport installation of a turning station according to the invention that is presently present is preferably composed of a rail-bound storage truck having at least one support thereon, wherein the storage truck is provided with lifting rams or a lifting cradle for raising and lowering metal sheets or metal sheet stacks. The deployable bars of the transfer installation can thus reposition the metal sheet or the metal sheet stack so as to be over the pallet where the lifting rams or the lifting cradle of the storage truck acquire the metal sheet or the metal sheet stack and lower the latter onto the pallet once the deployable bars have been retracted.

The subdivision of the turning station into three regions finally offers the advantage that two to three metal sheet or metal sheet stacks can be situated in a type of buffer from where said metal sheet or metal sheet stacks are then automatically transported away, in particular stored in a high-bay racking. When storing freshly supplied metal sheet or metal sheet stacks, the operator in this instance does not have to wait in each case until storing in a rack has been completed before the next metal sheet or the next metal sheet stack can be placed into the rotary installation.

By way of the turning station according to the invention, metal sheets can thus be stored individually or in a stack in a warehouse, preferably in a precise manner from an initial neutral position in the rotary installation. Moreover, metal sheets or metal sheet stacks can selectively also be picked from a warehouse and be automatically turned in the turning station according to the invention, for example so as to enable an inspection in the context of quality assurance by a buyer of metal sheets, or for achieving an orientation of metal sheets required for commissioning, this potentially being necessary in the case of metal sheets having dissimilar surfaces such as checker plates or bulb plates. Finally, a fresh alignment of metal sheet stacks and/or fresh storing can be automatically carried out by way of positively defined coordinates by the turning station according to the invention which is provided with a transfer installation and a transport installation.

The retrieving of the metal sheet stack from the rotary installation by a transfer installation in the case of a correspondingly designed turning station preferably takes place in such a manner that the horizontally deployable bars, in particular telescopic bars, are deployed on the first broadside of the transfer installation until said bars engage below the support which is momentarily below in the rotary installation, whereupon the lower support is lowered until the metal sheet or the metal sheet stack bears on the deployable bars. The deployable bars thereafter are retracted again so as to retrieve the metal sheet or the metal sheet stack from the rotary installation. The transfer installation can thus be designed having bars which are movable only in a horizontal manner, this being a significant simplification for dealing with great forces which act on the deployable bars.

BRIEF DESCRIPTION OF THE DRAWINGS

An exemplary embodiment for a turning station designed according to the invention will be described hereunder by the appended drawings and explained in more detail in the context of the use of said turning station, the latter representing examples of the methods according to the invention. In the drawings.

DETAILED DESCRIPTION

The drawings are schematic illustrations not to scale. Identical elements are elements with equivalent functions are identified by the same reference signs in the figures.

Figure 1:
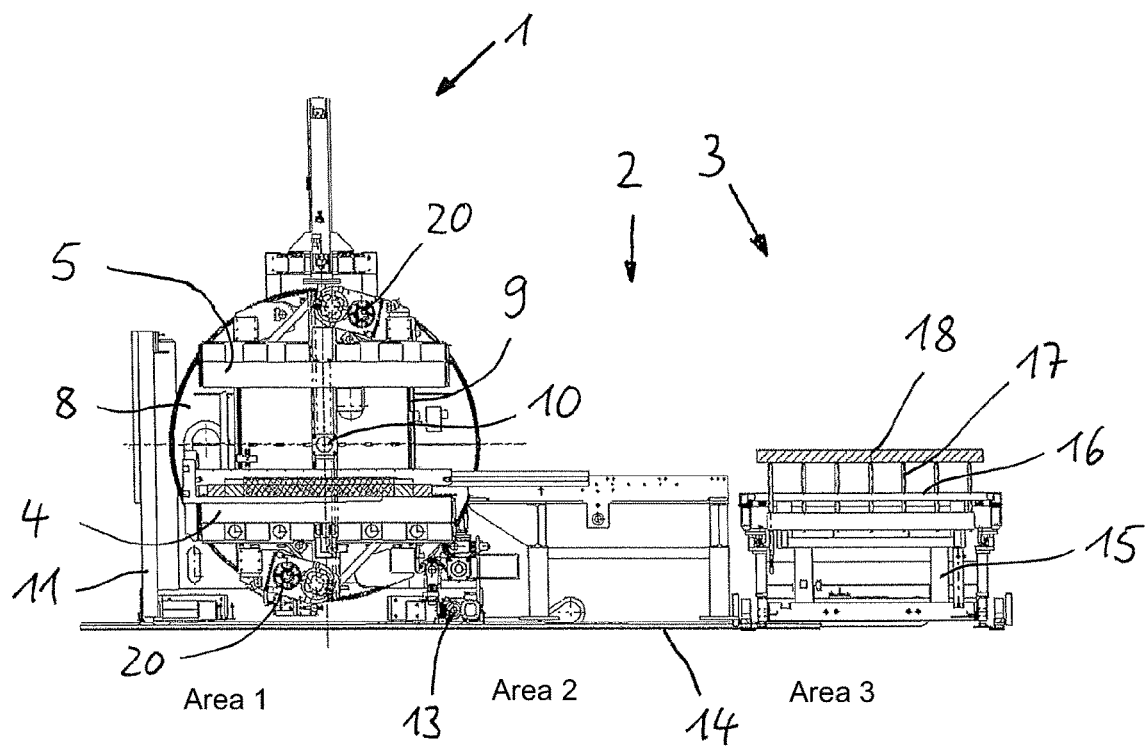
FIG. 1 shows a schematic lateral view of a turning station designed according to the invention.

FIG. 1 in a lateral view shows an exemplary embodiment for a turning station designed according to the invention, said turning station being subdivided into three regions. A first region is a rotary installation 1 in which metal sheets or metal sheet stacks can be rotated or turned, respectively. A second region is composed of a stationary transfer installation 2 for receiving a metal sheet or a metal sheet stack from the rotary installation 1. A transport installation 3 having a rail-bound storage truck 15 and the pallet 16 support thereon is disposed in a third region. The storage truck 15 possesses a number of lifting rams 17 which in FIG. 1 are deployed so as to lower a metal sheet stack 18 from a raised position onto the pallet 16.

Figure 2:
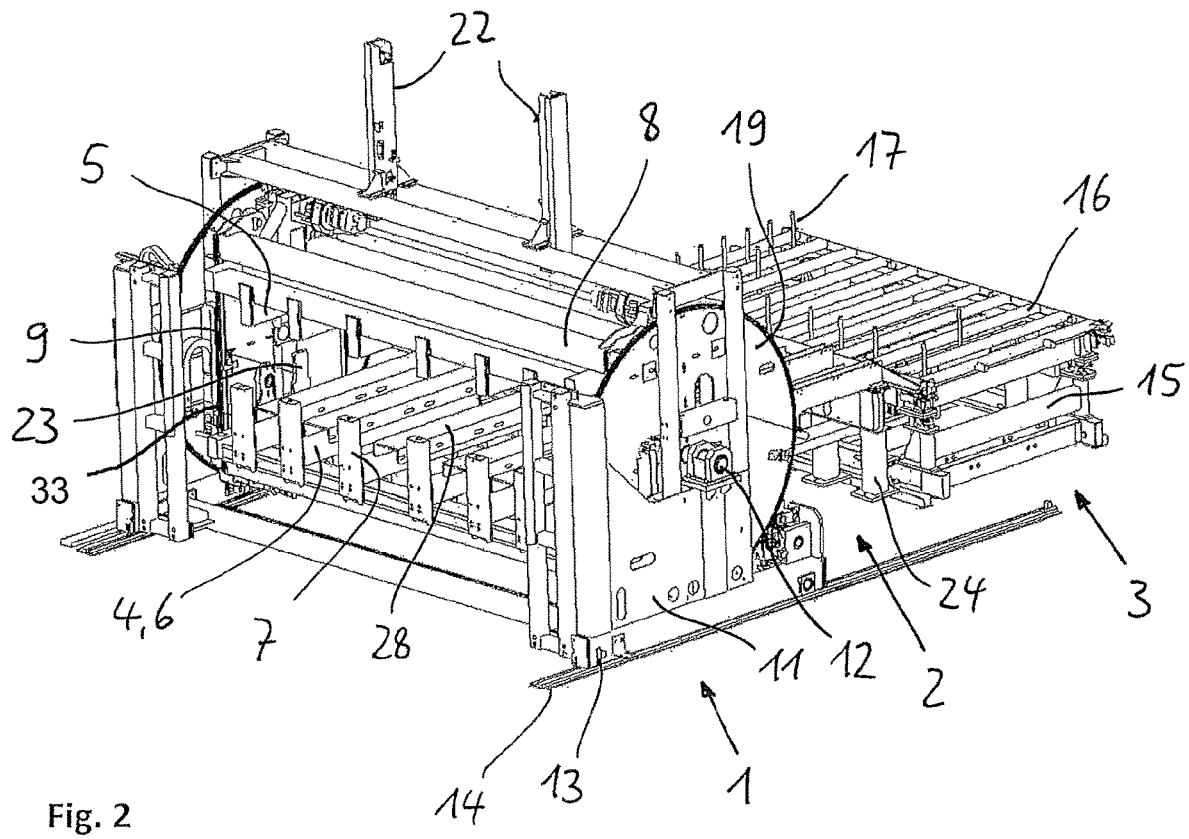
FIG. 2 shows a perspective view of the turning station from FIG. 1.

The individual elements of the rotary installation 1 can preferably be seen when viewing FIGS. 1 and 2 in combination. The rotary installation 1 has a first support 4 and a second support 5 for metal sheet stacks 18, or metal sheets, respectively, wherein the first support 4 in the neutral position of the rotary installation 1 illustrated forms the lower support, and the second support 5 forms the upper support. Both supports 4, 5 are composed of a number of webs 6 which at the end sides are provided with detents 7. This configuration in particular of the first support 4 enables metal sheet stacks 18 to be placed into the rotary installation 1 by a forklift truck in that the metal sheet stack 18 is introduced into the rotary installation 1 until said metal sheet stack 18 is situated above the first support 4, and the forks of the forklift truck are then lowered until said forks are situated approximately between the webs 6. The forklift truck then retracts the forks, on account of which the metal sheet stack 18, which by way of the detents 7 is retained on the webs 6, slides off. The metal sheets that have been introduced into the rotary installation 1 then bear on the detents 7.

The first support 4 and the second support 5 are mounted in a rotatable basket 8, specifically in linear guides 9 along which said supports 4, 5 are repositionable in a linear manner by way of support planes which are oriented so as to be mutually parallel. In the neutral position illustrated, this corresponds to upward and downward movements of the two supports 4, 5. The basket 8 can be provided with gear racks 33, indicated in FIGS. 2 and 3, by which the supports 4, 5 are able to be moved along the linear guides 9.

The first support 4 by way of the support plane thereof, and the second support 5 by way of the support plane thereof, are oriented so as to be mutually parallel and so as to be parallel with the rotation axis 10, and the rotation axis 10 is situated between the two supports 4, 5, or the two support planes, respectively. The supports 4, 5 in the linear guides 9 are adjusted symmetrically to the rotation axis 10 by the drive motors 20 such that said rotation axis 10 always lies between the two support planes.

The frame 11 of the rotary installation 1 by way of running wheels 13 rests on rails 14 such that the rotary installation 1 can be moved away from the transfer installation 2, for example so as to enable easier access for operators which release a metal sheet stack 18 that is situated on the lower support 4, 5 from the safety packaging of said metal sheet stack 18. In particular however, the rotary installation 1 on the rails 14 can also be moved across the transfer installation 2 so as to minimize the required floorspace of the turning station when not in use.

Figure 3:
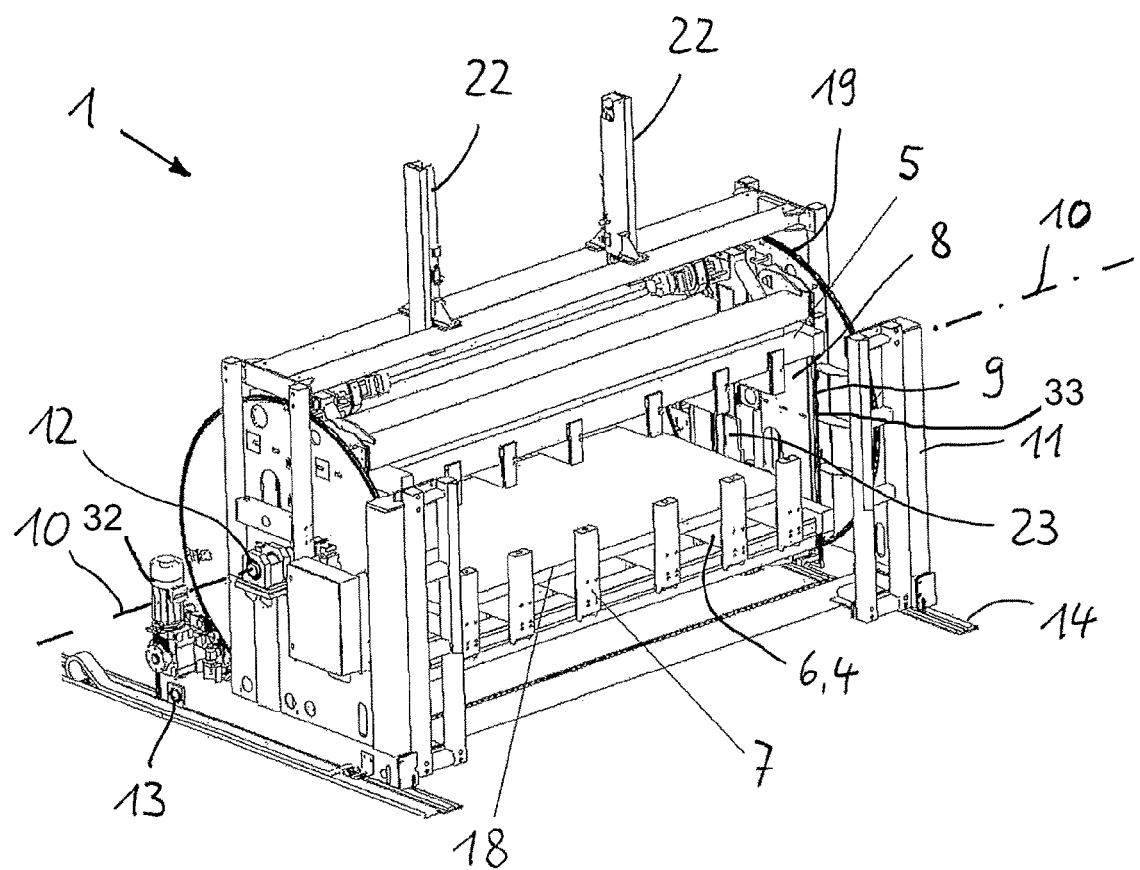
FIG. 3 shows a perspective view of the rotary installation of the turning station from FIG. 1.

FIG. 3 shows a further view of the rotary installation 1, wherein a metal sheet stack 18 bears on the webs 6 which form the first support 4. The supports 4, 5 are opened; this is the neutral position of the rotary installation 1. The basket 8 is shown mounted in the two rotary bearings 12 and is rotatable via a motor 32 about the rotation axis 10.

Figure 4:
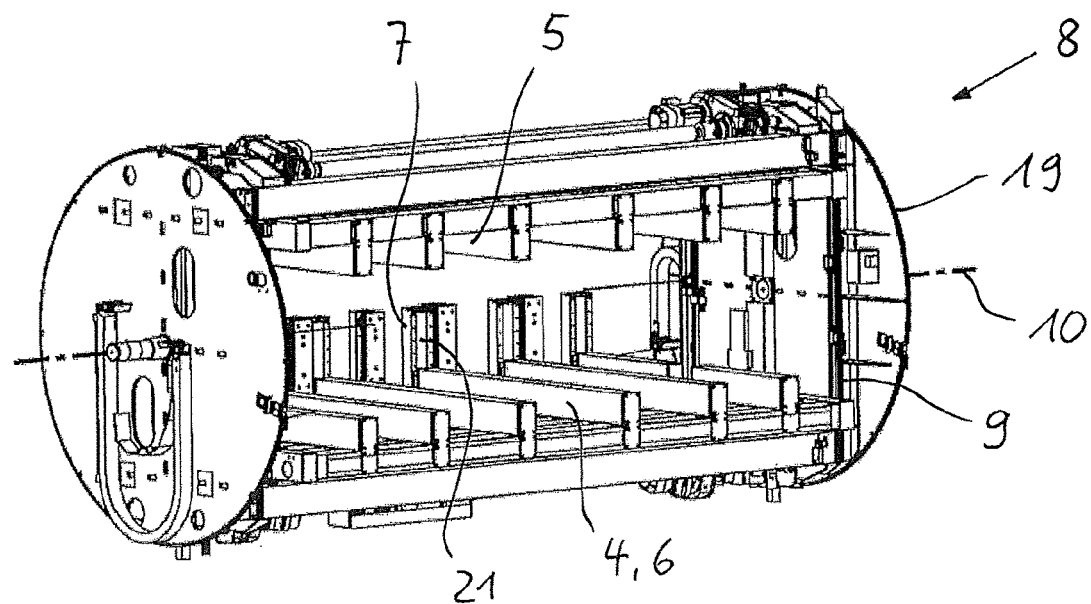
FIG. 4 shows a perspective view of parts of the rotary installation from FIG. 3.
Figure 5:
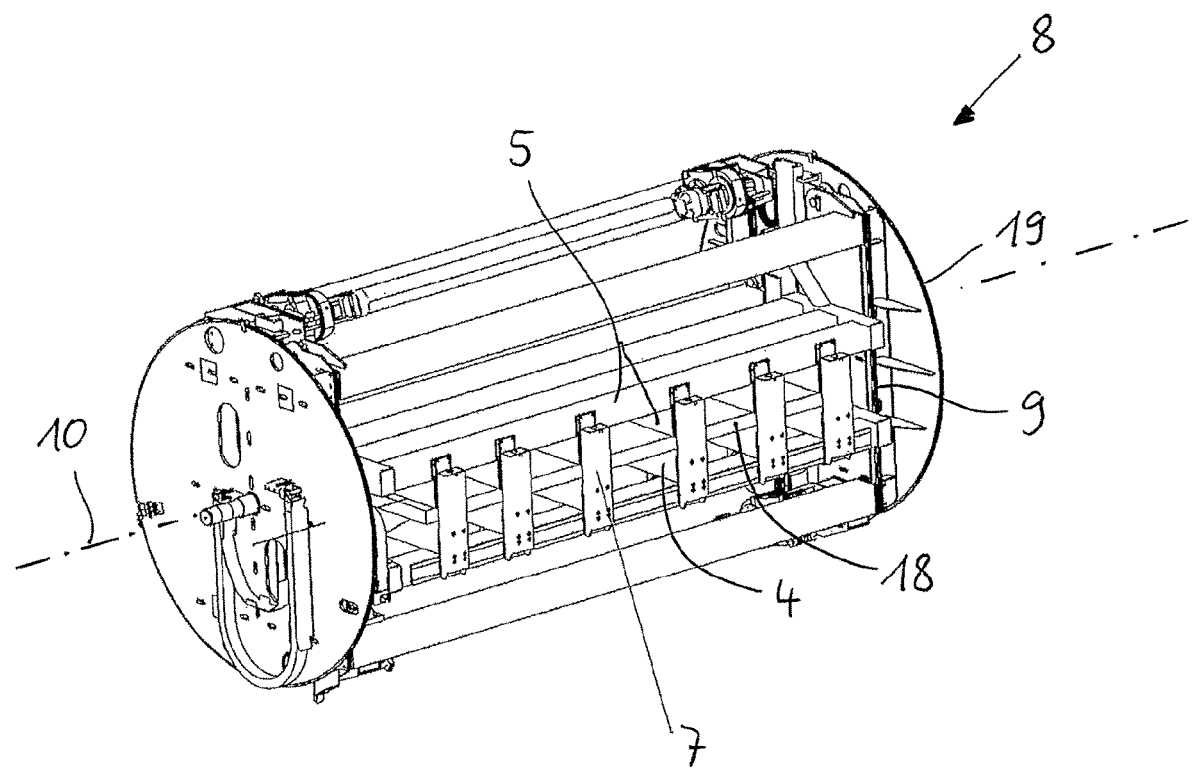
FIG. 5 shows a view as in FIG. 4, but in another method stage.
Figure 6:
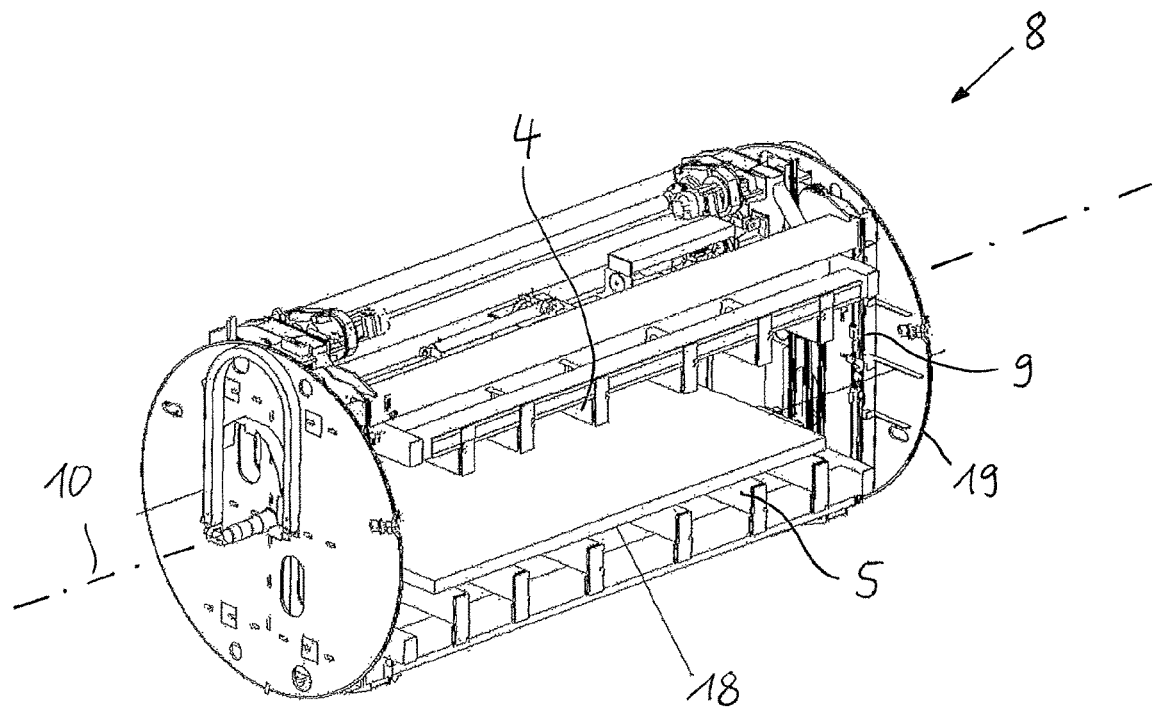
FIG. 6 shows a view as in FIG. 4, but in another method stage.

FIGS. 4, 5 and 6 show in each case only part of the rotary installation 1, specifically the basket 8 having the discs 19 thereof on the end sides, the linear guides 9, and the two supports 4, 5 which are repositionable in said linear guides 9. While FIG. 4 is intended to contribute to the better understanding of the construction of the rotary installation 1, wherein the elements illustrated, with the exception of in each case one track roller 21 in the detents 7 of the first support 4, have already been described in connection with FIGS. 1 to 3, FIGS. 5 and 6 conjointly with FIG. 3 represent three different temporal points in the use of the rotary installation 1.

The rotary installation 1 in FIG. 3 is situated in the neutral position, that is to say that the support 4 is situated below, and the support plane of said support 4 extends horizontally, while the second support 5 has been moved upward. A metal sheet stack 18 is placed onto the first support 4 and by way of a longitudinal edge bears on the detents 7 of the first support 4, more specifically on the track rollers 21 of the latter. The metal sheet stack 18 is now optionally accessible to an operator, for example for opening a safety packaging and largely removing the latter.

The two supports 4, 5 are now converged symmetrically to the rotation axis 10 such that a situation which is illustrated in FIG. 5 results. The metal sheet stack 18 is clamped between the first support 4 and the second support 5. The rotation axis 10 simultaneously extends through the metal sheet stack 18 such that the center of gravity thereof lies advantageously close to the rotation axis 10 and only comparatively minor forces are consequently required for rotating the basket 8 by 180°.

The situation resulting after this rotation is shown in FIG. 6. In the latter, the first support 4, which is now situated at the top, and the second support 5 which is now situated below, have been diverged again such that the metal sheet stack 18, now bearing on the second support 5, is again accessible to an operator. Said metal sheet stack 18 has been turned by 180° such that the operator can now remove those parts of a safety packaging that to date have been situated on the lower side of the metal sheet stack 18, for example.

Figure 7:
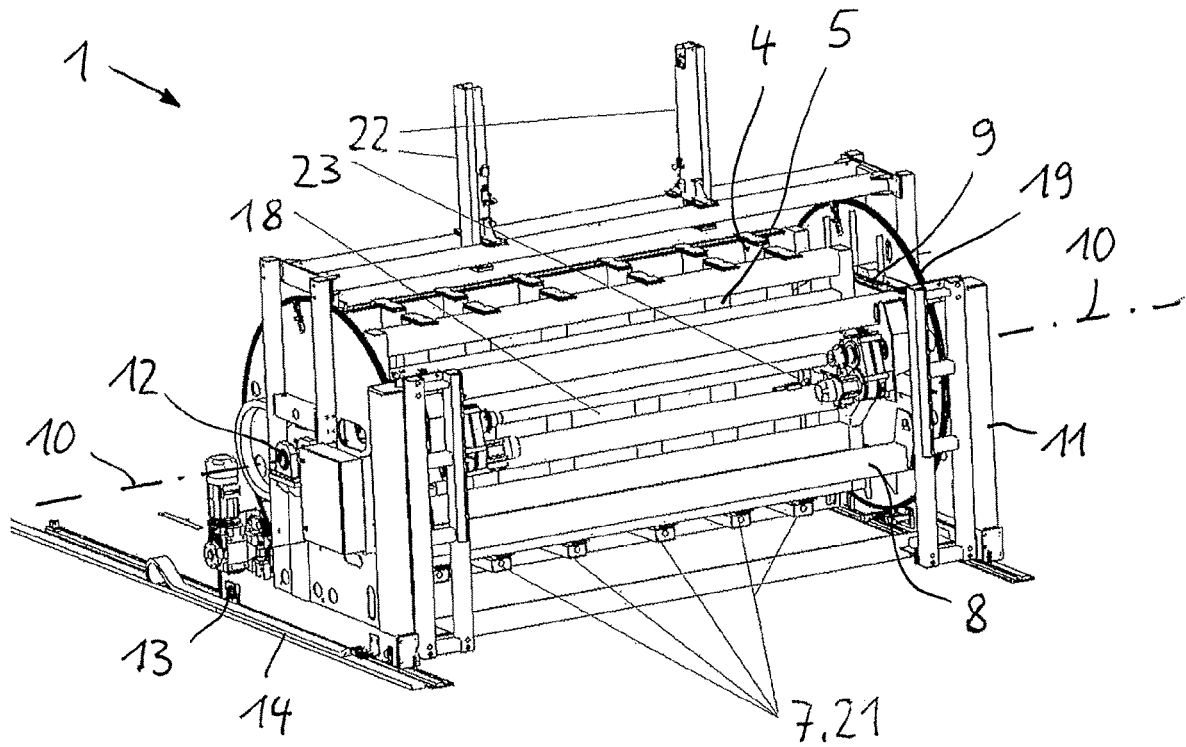
FIG. 7 shows a perspective view of the rotary installation from FIG. 3, in another method stage.
Figure 8:
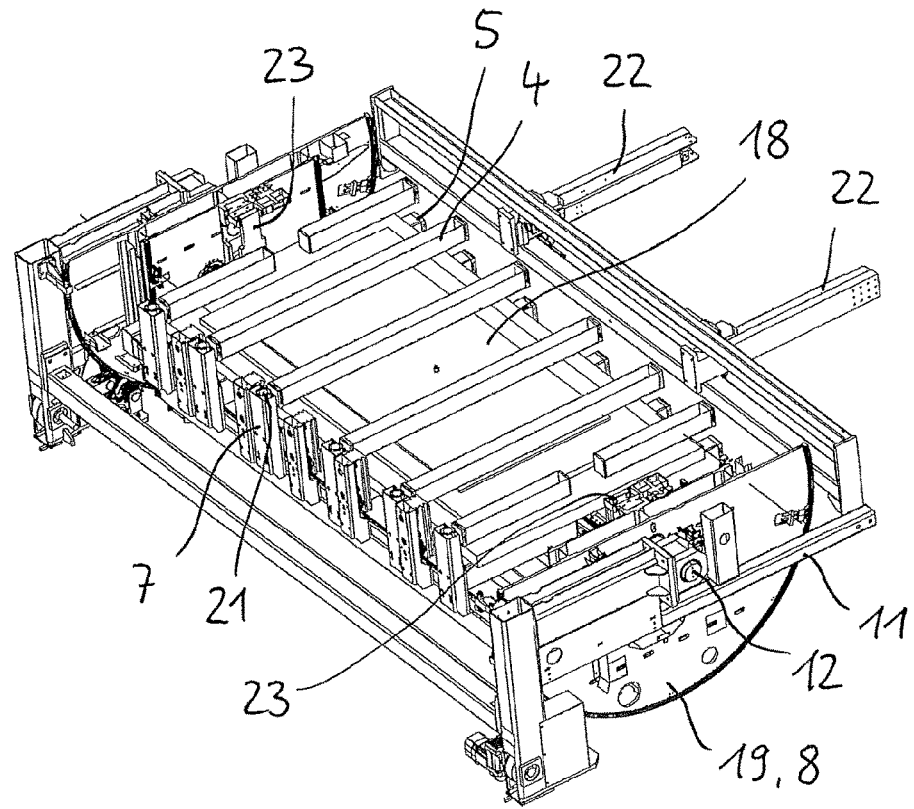
FIG. 8 shows a schematic illustration of part of the rotary installation from FIG. 7.

FIG. 7 shows the rotary installation 1 in an optional intermediate stage, the latter being able to be slotted between the temporal points which are illustrated in FIGS. 5 and 6. The rotatable basket 8 of the rotary installation 1 here has initially been rotated only by 90 angular degrees about the rotation axis 10 such that the supports 7 by way of the track rollers 21 thereof are now situated below. The metal sheet stack 18 is situated between the first support 4 and the second support 5 but is no longer fixedly clamped therebetween since the supports 4, 5 have been slightly opened. Rather, the metal sheet stack 18 by way of the longitudinal edges of the individual metal sheets now bears on the track rollers 21. The individual metal sheets of the metal sheet stack 18 are aligned in this intermediate stage, this being better highlighted in a sectional illustration in FIG. 8. On the one hand, the metal sheets by way of two first pushing units 22 that are mounted on the frame 11 are pushed against the webs 6, or the track rollers 21 thereof, respectively, and on the other hand, lateral second pushing units 23 which push together the end-side longitudinal edges of the individual metal sheets of the metal sheet stack 18 are provided. The metal sheets of the metal sheet stack 18 are thus precisely mutually aligned and optionally also moved to a neutral position, the coordinates of said neutral position being known and able to be used when further transporting, in particular storing, the metal sheet stack 18. The metal sheet stack 18 is thereafter clamped again by converging the two supports 4, 5 and is rotated by a further 90° so as to form the situation illustrated in FIG. 6. The turned metal sheet stack 18 can be retrieved in a mechanized manner from the rotary installation 1 in particular in this situation.

Figure 9:
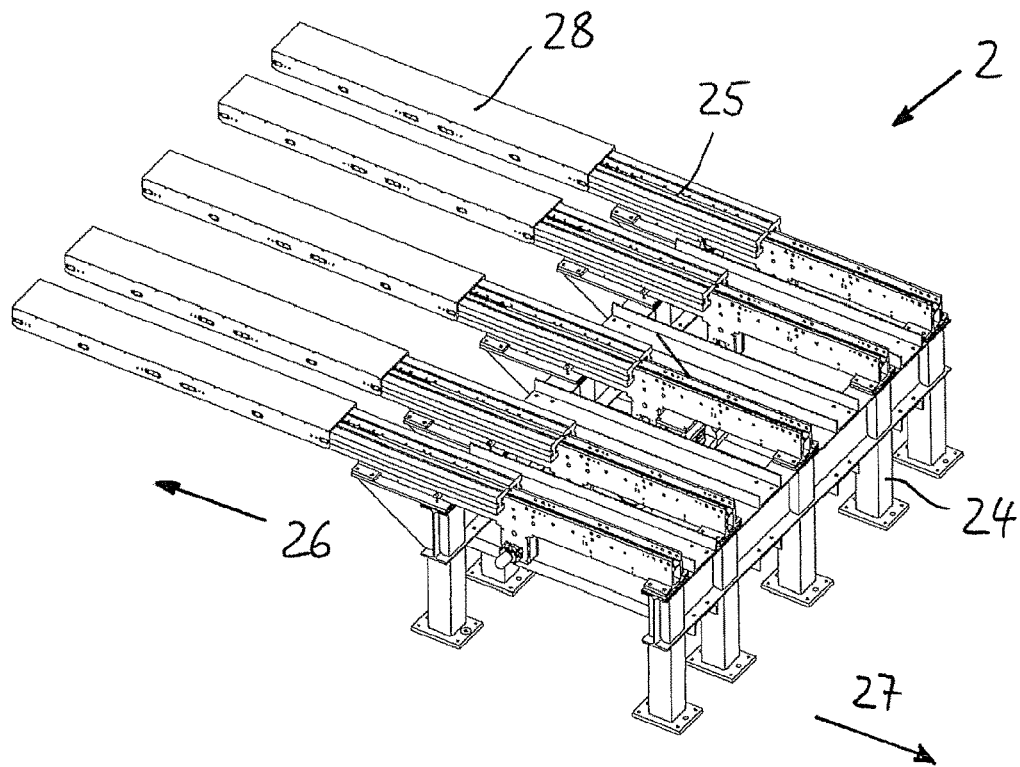
FIG. 9 shows a view of the stationary transfer installation of the turning station from FIG. 1.

The retrieving of the turned metal sheet stack 18 from the rotary installation 1 takes place by the transfer installation 2 which is illustrated in FIG. 9. Said transfer installation 2 is composed of a stationary transfer frame 24 to which a number of telescopic bars 25 are fastened, said telescopic bars 25 being able to be deployed on a first broadside 26, which is oriented toward the rotary installation 1, and additionally able to be deployed on a second broadside 27, which is oriented toward the transport installation 3. The metal sheet stack 18 can be engaged below by the bearing sleeves 28 which are attached to the telescopic bars 25 and be raised so as to be removed from the rotary installation, as well as lowered so as to bear on the lifting rams 17 of the transport installation 3 (FIG. 1). The raising and lowering however takes place only relative to the rotary installation 1 and to the lifting rams 17 of the transport installation 3, because the telescopic bars 25 in reality are movable only horizontally but not vertically, this increasing the load bearing capability for the weight of the metal sheet stack 18. Rather, the first support 4 is lowered when raising the metal sheet stack 18 from the first support 4, while the telescopic bars 25 remain unchanged in vertical terms. The metal sheet stack 18 then bears on the bearing sleeves 28 of the telescopic bars 25. In analogous manner, the lifting rams 17 of the storage truck 15 raise a metal sheet stack 18 that bears on the bearing sleeves 18 of the telescopic bars 25 on the second side 17 of the transfer installation 2 such that the telescopic bars 25 can be retracted again while the metal sheet stack 18 remains on the lifting rams 17 and by way of the latter can be lowered onto the pallet 16 on the storage truck 15.

Figure 10:
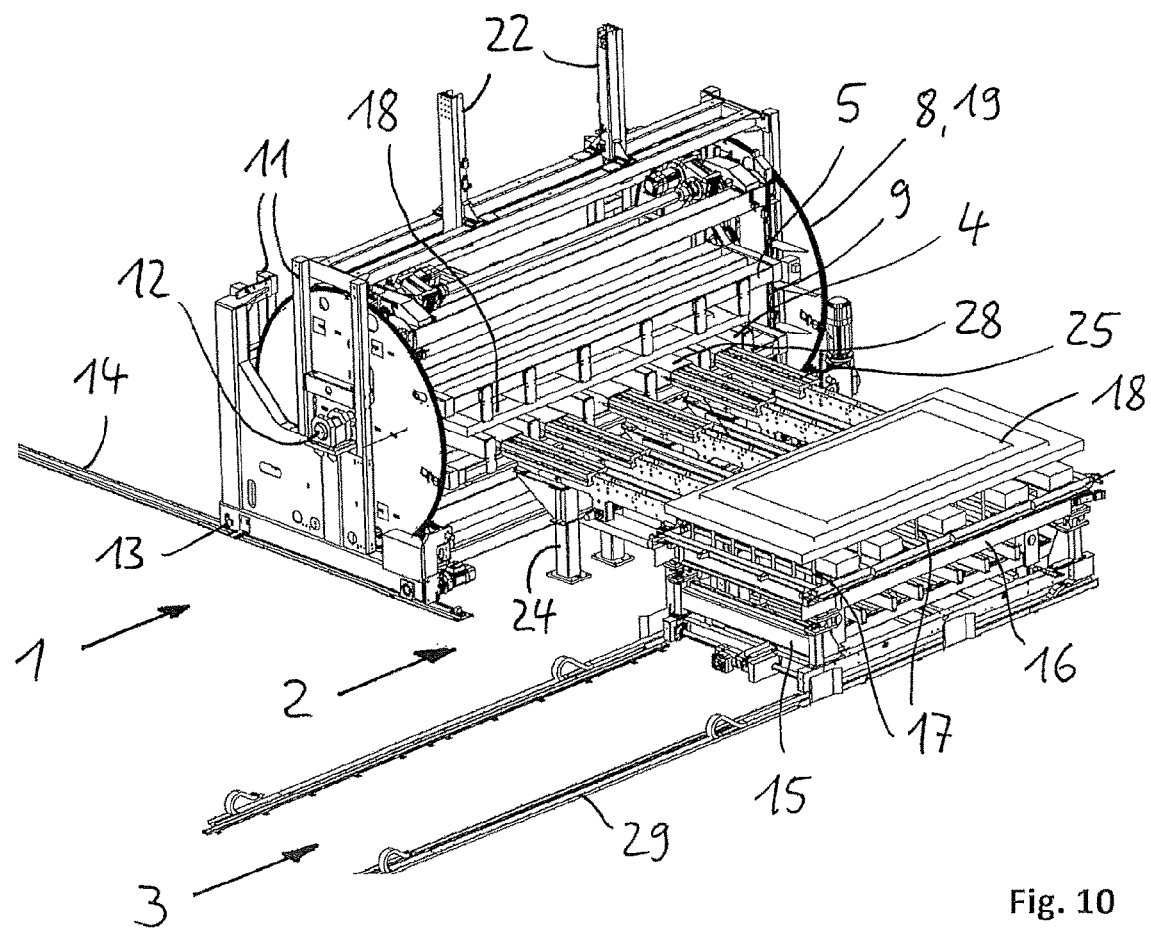
FIG. 10 shows a further perspective view of the turning station from FIG. 1.

FIG. 10 shows a further overall illustration of the turning installation having the rotary installation 1, the transfer installation 2, and the transport installation 3, wherein a metal sheet stack 18 in this illustration lies so as to be buffered on the transport installation 3, awaiting to be stored along a rail track 29 in a metal sheet warehouse (not illustrated). At the same time, the telescopic bars 25 of the transfer installation 2 on the first broadside 26 of the latter are already deployed into the rotary installation 1 again so as to retrieve from the latter a next metal sheet stack 18.

LIST OF REFERENCE SIGNS

1 Rotary installation
2 Transfer installation
3 Transport installation
4 First support
5 Second support
6 Webs
7 Detents
8 Basket
9 Linear guides
10 Rotation axis
11 Frame
12 Rotary bearing
13 Running wheels
14 Rails
15 Storage truck
16 Pallet
17 Lifting ram
18 Metal sheet stack
19 End-side disks
20 Drive motors
21 Track roller
22 (First) pushing units
23 (Second) pushing units
24 Transfer frame
25 Telescopic bars 26 First broadside (of 2)
27 Second broadside (of 2)
28 Support sleeves
29 Rail track
30 First side (of 18)
31 Second side (of 18)
32 Motor
33 Gear racks

The invention claimed is:

1. A turning station for metal sheets or metal sheet stacks (18), the turning station comprising:
   a first support (4) which forms a first support plane for a first side of the metal sheets;
   a second support (5) which forms a second support plane for a second side of the metal sheets;
   the first and second supports (4, 5) are in each case rotatable about a horizontal rotation axis (10) and are provided with a plurality of detents (7), that project beyond the support plane of the supports (4, 5) and are adapted to support longitudinal edges of the metal sheets;
   the first and second supports (4, 5) are part of a rotary installation (1) which further comprises:
      a frame (11) having two end-side rotary bearings (12) which lie in a common rotation axis (10);
      a basket (8) which is mounted in the two rotary bearings (12) and is rotatable via a motor about the rotation axis (10), said basket (8) having end-side linear guides (9) for the two supports (4, 5);
   wherein the two supports (4, 5) by way of support planes which run in parallel and are oriented toward one another are held in the basket (8) such that the rotation axis (10) is situated between the two support planes, and the two supports (4, 5) are in each case movable in a motorized manner in the end-side linear guides (9) in a movement direction toward and away from the rotation axis (10); and
   a stationary transfer installation (2) having a plurality of horizontally oriented bars which on both sides are conjointly deployable horizontally and are adapted for depositing the metal sheets or the metal sheet stack, the bars are deployable on a first broadside (26) of the transfer installation (2) to engage below a support (4) in the rotary installation (1), and are deployable on a second broadside (27) of the transfer installation (2) to provide for transfer of the metal sheets or the metal sheet stack to a transport installation (3).

2. The turning station as claimed in claim 1, wherein the two supports (4, 5) are movable symmetrically to a plane of the rotation axis (10).

3. The turning station as claimed in claim 1, wherein the first and second supports (4, 5) are in each case formed by a plurality of webs (6) which extend transversely to the rotation axis (10).

4. The turning station as claimed in claim 1, wherein the basket (8) is provided with gear racks by which the supports (4, 5) are able to be moved along the linear guides (9).

5. The turning station as claimed in claim 1, further comprising at least one pushing unit (22, 23) configured to act on the longitudinal edges of the metal sheets for pushing metal sheets, the at least one pushing unit is attached on the rotatable basket (8) within a displacement plane which is parallel to the support planes.

6. The turning station as claimed in claim 1, wherein the frame (11) is provided with running wheels (13) for displacing or repositioning the rotary installation (1), and the rotary installation (1) is movable by the running wheels (13) at least partially across the stationary transfer installation (2).

7. The turning station as claimed in claim 6, further comprising a transport installation (3), the transfer installation (2) is disposed between the rotary installation (1) and the transport installation (3), and the transport installation (3) comprises at least one pallet (16) adapted for depositing and storing metal sheets or metal sheet stacks (18).

8. The turning station as claimed in claim 7, wherein the transport installation (3) is comprised substantially of a rail-bound storage truck (15) having at least one pallet (16) support thereon, the storage truck (15) is provided with lifting rams (17) or a lifting cradle configured for raising and lowering metal sheets or metal sheet stacks (18).

9. A method for turning metal sheets or metal sheet stacks (18) using the turning station as claimed in claim 7, said method comprising: ensuring that the rotary installation (1) of the turning station is situated in a neutral position in which the first and second supports (4, 5) are mutually spaced apart and the support planes run horizontally;
   removing a metal sheet or a metal sheet stack (18) from the transport installation (3) by the transfer installation (2);
   introducing the metal sheet or the metal sheet stack (18) into the rotary installation (1) by the transfer installation (2) and depositing the former on the first support (4) which is momentarily disposed below;
   converging the first and second supports (4, 5) and clamping the metal sheet or the metal sheet stack (18) between the first and second supports (4, 5);
   rotating the rotatable basket (8) of the rotary installation (1) about 180 angular degrees, and diverging the first and second supports (4, 5);
   retrieving the metal sheet stack (18) from the rotary installation (1) by the transfer installation (2);
   transferring the metal sheet stack (18) from the transfer installation (2) to the transport installation (3).

10. A method for storing metal sheet stacks (18) using a turning station as claimed in claim 8, said method comprising:
   ensuring that the rotary installation (1) of the turning station is situated in a neutral position in which the first and second supports (4, 5) are mutually spaced apart and the support planes run horizontally;
   introducing the metal sheet stack (18) into the rotary installation (1) and depositing the metal sheet stack on the first support (4) which is momentarily disposed below;
   converging the first and second supports (4, 5) and clamping the metal sheet stack (18) between the first and second supports (4, 5);
   rotating the rotatable basket (8) of the rotary installation (1) about 180 angular degrees, and diverging the first and second supports (4, 5);
   retrieving the metal sheet stack (18) from the rotary installation (1) using the transfer installation (2), or converging the first and second supports (4, 5) and clamping the metal sheet stack (18) between the first and second supports (4, 5) as well as reversing the rotatable basket (8) of the rotary installation (1) by 180 angular degrees, and retrieving the metal sheet stack (18) from the rotary installation (1) by way of the transfer installation (2);
   transferring the metal sheet stack (18) from the transfer installation (2) to the transport installation (3).

11. The method as claimed in claim 10, wherein the retrieving of the metal sheet stack (18) from the rotary installation (1) by the transfer installation (2) takes place such that the horizontally deployable bars are deployed on a first broadside (26) of the transfer installation (2) until said bars engage below the momentarily lower first support (4), that the lower first support (4) thereupon is lowered until the metal sheet or the metal sheet stack (18) bears on the deployable bars, and the deployable bars thereafter are retracted again so as to retrieve the metal sheet or the metal sheet stack (18) from the rotary installation (1).

12. The method as claimed in claim 10, wherein the transferring of the metal sheet stack (18) from the transfer installation (2) to the transport installation (3) takes place such that the horizontally deployable bars with the metal sheet or the metal sheet stack (18) are deployed on the second broadside (27) of the transfer installation (2) until the metal sheet or the metal sheet stack (18) is situated above the pallet (16), the metal sheet or the metal sheet stack (18) is then raised by the lifting rams (17) of the storage truck (15), the deployable bars thereafter are retracted again, and the lifting rams (17) or the lifting cradle finally is lowered until the metal sheet or the metal sheet stack (18) bears on the pallet (16).

13. A method for unpackaging metal sheet stacks (18) using the turning station as claimed in claim 1, said method comprising:
  ensuring that the rotary installation (1) of the turning station is situated in a neutral position in which the first and second supports (4, 5) are mutually spaced apart and the support planes run horizontally;
  introducing the metal sheet stack (18) into the rotary installation (1) and depositing the metal sheet stack (81) on the first support (4) which is momentarily disposed below;
  opening a packaging of the metal sheet stack (18) before or after introducing the metal sheet stack into the rotary installation (1);
  converging the first and second supports (4, 5) and clamping the metal sheet stack (18) between the first and second supports (4, 5);
  rotating the rotatable basket (8) of the rotary installation (1) about 180 angular degrees, and diverging the first and second supports (4, 5);
  removing the packaging of the metal sheet stack (18);
  retrieving the metal sheet stack (18) from the rotary installation (1), or converging the first and second supports (4, 5) and clamping the metal sheet stack (18) between the first and second supports (4, 5) as well as reversing the rotatable basket (8) of the rotary installation (1) by 180 angular degrees, and retrieving the metal sheet stack (18) from the rotary installation (1).

14. The method as claimed in claim 13, wherein the introducing of the metal sheet stack (18) into the rotary installation (1), and the depositing of the metal sheet stack on the first support (4) which is momentarily disposed below, takes place such that the metal sheet stack (18) on at least one longitudinal edge of the metal sheets bears on the detents (7) which project beyond the support plane of the first support (4), and wherein the rotary installation (1) is rotated such that the longitudinal edges of the metal sheets that bear on the detents (7) are oriented downward.

15. The method as claimed in claim 14, wherein the rotary installation (1), after the introducing and depositing of the metal sheet or of the metal sheet stack (18) and the converging of the first and second supports (4, 5) and the clamping of the metal sheet stack (18) between the first and second supports (4, 5), is rotated by 90 angular degrees, whereupon the first and second supports (4, 5) are slightly diverged and one or all metal sheets of the metal sheet stack (18) are pushed by a pushing unit (22) such that a longitudinal edge of the metal sheets is against the detents (7).

16. The method as claimed in claim 15, wherein the first and second supports (4, 5) are in each case formed by a plurality of webs (6) which extends transversely to the rotation axis (10), and the metal sheet or all metal sheets of the metal sheet stack (18) are pushed to a neutral position by at least one pushing unit (23) that engages on an end side.

17. A turning station for metal sheets or metal sheet stacks (18), the turning station comprising:
  a first support (4) which forms a first support plane for a first side of the metal sheets;
  a second support (5) which forms a second support plane for a second side of the metal sheets;
  the first and second supports (4, 5) are in each case rotatable about a horizontal rotation axis (10) and are provided with a plurality of detents (7), that project beyond the support plane of the supports (4, 5) and are adapted to support longitudinal edges of the metal sheets;
  the first and second supports (4, 5) are part of a rotary installation (1) which further comprises:
    a frame (11) having two end-side rotary bearings (12) which lie in a common rotation axis (10);
    a basket (8) which is mounted in the two rotary bearings (12) and is rotatable via a motor about the rotation axis (10), said basket (8) having end-side linear guides (9) for the two supports (4, 5);
  wherein the two supports (4, 5) by way of support planes which run in parallel and are oriented toward one another are held in the basket (8) such that the rotation axis (10) is situated between the two support planes, and the two supports (4, 5) are in each case movable in a motorized manner in the end-side linear guides (9) in a movement direction toward and away from the rotation axis (10); and
  wherein at least part of the detents (7) for longitudinal edges of the metal sheets are provided with track rollers (21) for the longitudinal edges.

* * * * *